US012640433B2

(12) United States Patent
Morishita

(10) Patent No.: US 12,640,433 B2
(45) Date of Patent: May 26, 2026

(54) BATTERY MODULE

(71) Applicant: SANYO Electric Co., Ltd., Osaka (JP)

(72) Inventor: Taijyu Morishita, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 784 days.

(21) Appl. No.: 17/906,480

(22) PCT Filed: Jan. 20, 2021

(86) PCT No.: PCT/JP2021/001784

§ 371 (c)(1),
(2) Date: Sep. 16, 2022

(87) PCT Pub. No.: WO2021/199592

PCT Pub. Date: Oct. 7, 2021

(65) Prior Publication Data

US 2023/0170573 A1       Jun. 1, 2023

(30) Foreign Application Priority Data

Mar. 31, 2020    (JP) ................................. 2020-064243

(51) Int. Cl.
H01M 50/293 (2021.01)
H01M 10/6566 (2014.01)
H01M 50/209 (2021.01)

(52) U.S. Cl.
CPC ..... H01M 50/293 (2021.01); H01M 10/6566 (2015.04); H01M 50/209 (2021.01)

(58) Field of Classification Search
None
See application file for complete search history.

(56) References Cited

U.S. PATENT DOCUMENTS

| | | | |
|---|---|---|---|
| 2018/0019454 A1 | 1/2018 | Okada et al. | |
| 2019/0131665 A1 | 5/2019 | Iwakura et al. | |

FOREIGN PATENT DOCUMENTS

| | | | | |
|---|---|---|---|---|
| CN | 108899448 | 11/2018 | | |
| JP | 2016-122633 | 7/2016 | | |
| JP | 2017-076503 | 4/2017 | | |
| JP | 2019-079737 | 5/2019 | | |
| JP | 2020-043005 | 3/2020 | | |
| JP | 2020043005 A | * 3/2020 | ............ | H01M 50/20 |
| WO | 2013/161655 | 10/2013 | | |
| WO | 2016/157267 | 10/2016 | | |

OTHER PUBLICATIONS

International Search Report of PCT application No. PCT/JP2021/001784 dated Apr. 6, 2021.

* cited by examiner

*Primary Examiner* — Alix E Eggerding

(74) *Attorney, Agent, or Firm* — WHDA, LLP

(57) ABSTRACT
Battery module includes: battery stack in which a plurality of batteries are stacked; and separator disposed between the adjacent batteries, the separator having displacement absorbing material in contact with a surface intersecting a stacking direction of any one of the plurality of batteries. Positions of both ends of battery stack in the stacking direction are fixed, and battery stack is disposed.

4 Claims, 7 Drawing Sheets

BATTERY MODULE

CROSS-REFERENCE TO RELATED APPLICATIONS

This application is a U.S. national stage application of the PCT International Application No. PCT/JP2021/001784 filed on Jan. 20, 2021, which claims the benefit of foreign priority of Japanese patent application No. 2020-064243 filed on Mar. 31, 2020, the contents all of which are incorporated herein by reference.

TECHNICAL FIELD

The present invention relates to a battery module.

BACKGROUND ART

For example, as a power source for a vehicle or the like that requires a high output voltage, there has been known a battery module formed by electrically connecting a plurality of batteries to each other. In general, in each battery constituting a battery module, an internal electrode body, an electrolyte, and the like degrade over time, and bulge due to deposition or oxidation of a metal material, and a change appears in an outer shape. Regarding a battery module including such a battery, PTL 1 discloses a battery module including a battery stack in which a plurality of batteries are stacked and an insulating sheet is interposed between the batteries, and end plates provided at both ends in the stacking direction of the battery stack.

CITATION LIST

Patent Literature

PTL 1: WO 2013/161655 A

SUMMARY OF THE INVENTION

The battery expands or contracts as it is charged and discharged. In addition, the battery expands due to aging degradation. When each battery in the battery module bulges, each battery and the insulating sheet are brought into a state from surface contact to point contact in the stacking direction. The positions at which the batteries and the insulating sheet are in point contact with each other are not necessarily overlapped at the same position as viewed in the stacking direction on a plane intersecting the stacking direction of the batteries, and the batteries are rotationally displaced around an axis intersecting the stacking direction as the contact positions are changed, and the relative displacements of the batteries are not uniform but vary. In order to suppress variation in relative displacement of each battery, a component for holding each battery in a three-axis restraint is required.

The present invention has been made in view of such circumstances, and an object of the present invention is to provide a technique for suppressing variation in relative displacement of each battery while holding each battery in a battery module in a uniaxial constraint.

A battery module according to an aspect of the present invention includes: a battery stack in which a plurality of batteries are stacked; and a separator disposed between the adjacent batteries, the separator including a displacement absorbing material in contact with a surface intersecting a stacking direction of any one of the plurality of batteries.

Positions of both ends of the battery stack in the stacking direction are fixed, and the battery stack is disposed.

According to the present invention, it is possible to suppress variation in relative displacement of each battery while holding each battery in the battery module in a uniaxial constraint.

DESCRIPTION OF EMBODIMENT

Figure 1:
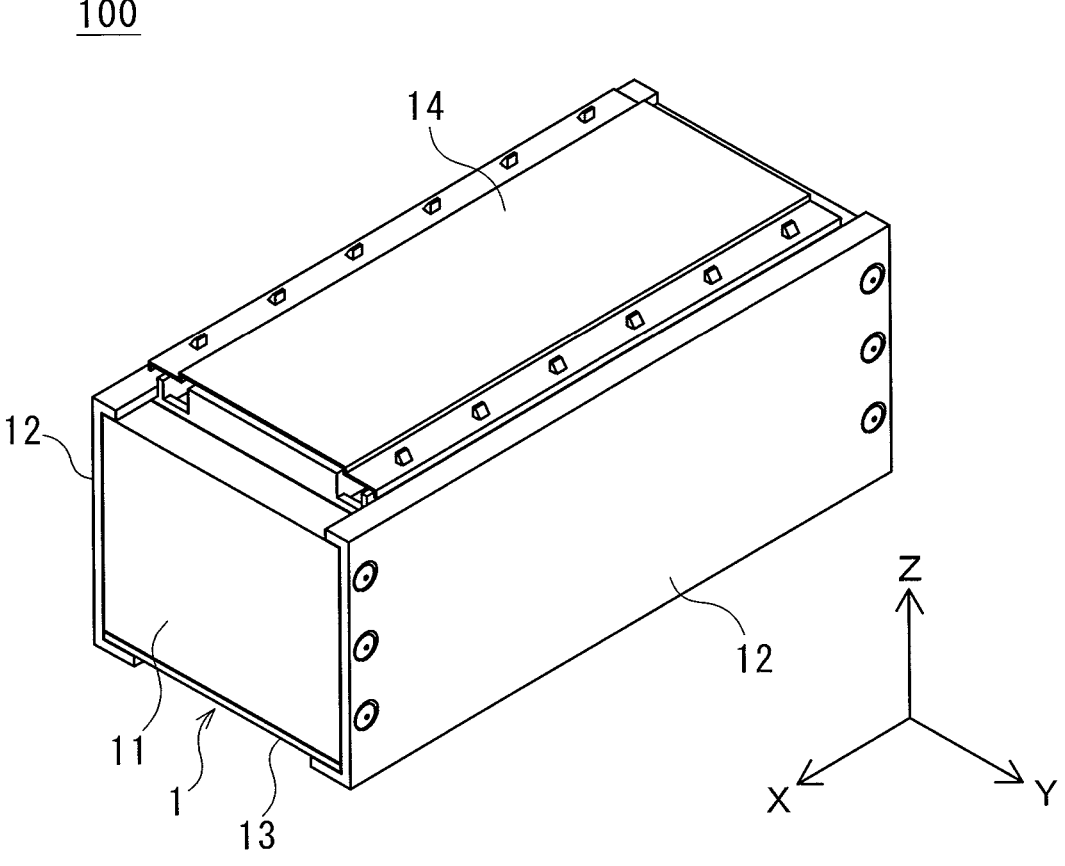
FIG. 1 is a perspective view illustrating an appearance of a battery module according to an exemplary embodiment.

Hereinafter, the present invention will be described based on a preferred exemplary embodiment with reference to the drawings. The exemplary embodiment is not intended to limit the invention but is an example, and all features described in the exemplary embodiment and combinations thereof are not necessarily essential to the invention. The same or equivalent constituent elements, members, and processing illustrated in the drawings are denoted by the same reference numerals, and a redundant description will be omitted as appropriate. The scale and the shape of each part illustrated in each figure are set for the sake of convenience in order to facilitate the understanding of the description and should not be interpreted in a limited manner unless otherwise specified. In cases where terms such as "first" and "second" are used in the present description or claims, these terms do not represent any order or importance but are intended to distinguish one configuration from another configuration, unless otherwise specified. From each of the drawings, some of members not important for describing the exemplary embodiments are omitted.

EXEMPLARY EMBODIMENT

Figure 2:
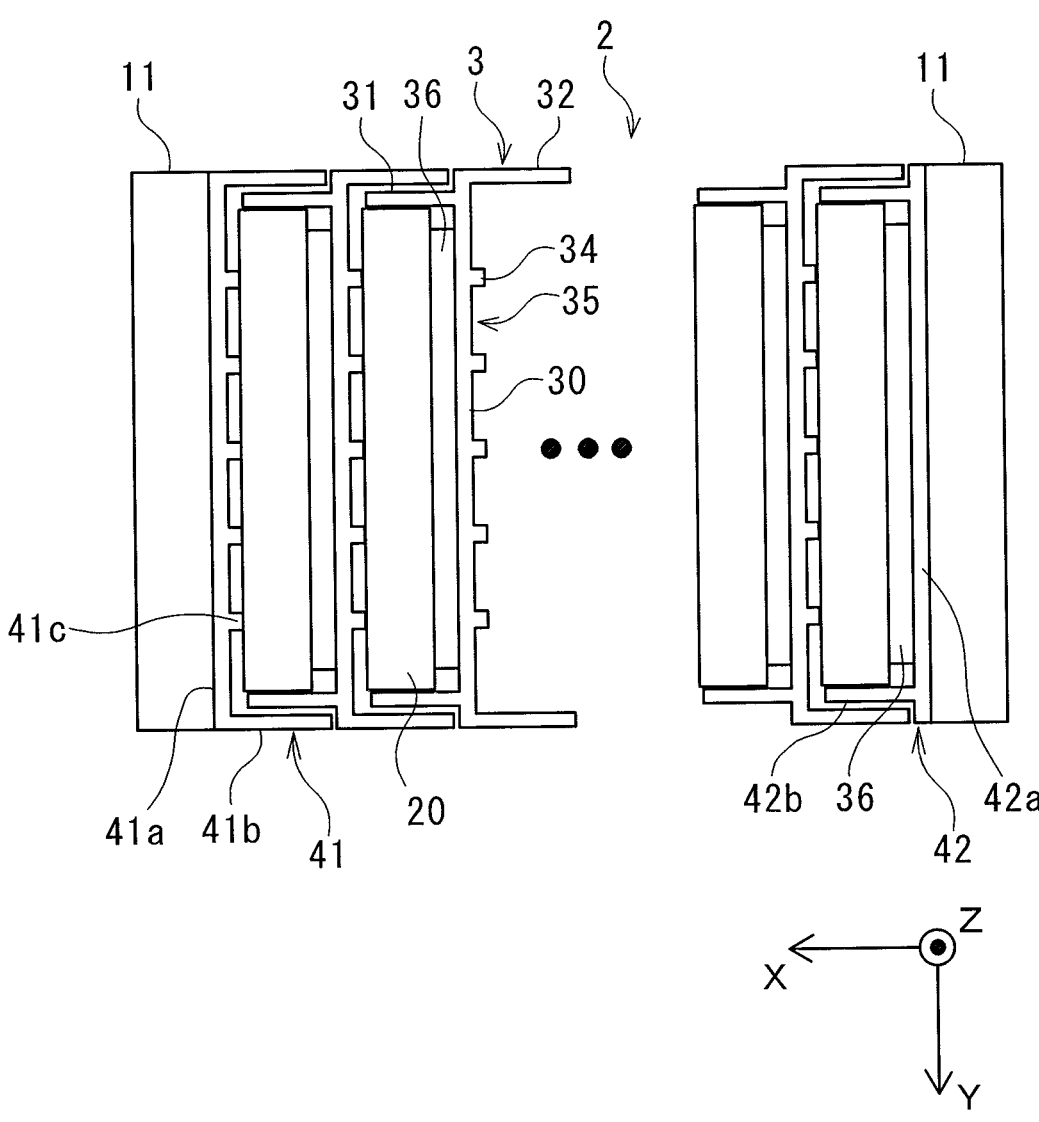
FIG. 2 is a horizontal cross-sectional view of a battery stack included in a battery module.

FIG. 1 is a perspective view illustrating an appearance of battery module 100 according to the exemplary embodiment, and FIG. 2 is a horizontal cross-sectional view of battery stack 2 included in battery module 100. Battery module 100 includes housing 1 having a rectangular-parallelepiped shape, battery stack 2, separator 3, and end separators 41 and 42. In battery module 100, separator 3 is used to hold battery 20 in a uniaxial constraint, and displacement absorbing material 36 suppresses relative displacement of battery 20. In each drawing, a stacking direction of batteries 20 is defined as an X direction, a horizontal direction intersecting the X direction is defined as a Y direction, and a vertical direction intersecting the X direction is defined as a Z direction.

Housing 1 includes end plate 11, side plate 12, base plate 13, and cover plate 14. End plates 11 are provided outside batteries 20 positioned at both ends of battery stack 2 in the stacking direction of batteries 20. Side plate 12 sandwiches end plate 11 and covers a side surface of battery stack 2. Base plate 13 is configured by covering a bottom of battery stack 2. Cover plate 14 covers an upper surface of battery stack 2.

Battery stack 2 is housed inside housing 1. Battery stack 2 is formed by stacking a plurality of batteries 20 in one direction. A separator 3 formed of a resin material or the like is provided between the batteries. Separator 3 electrically insulates each battery 20 of battery stack 2. Separator 3 may be considered to constitute a part of battery stack 2 because separator 3 is incorporated into and integrated with battery stack 2.

Figure 3:
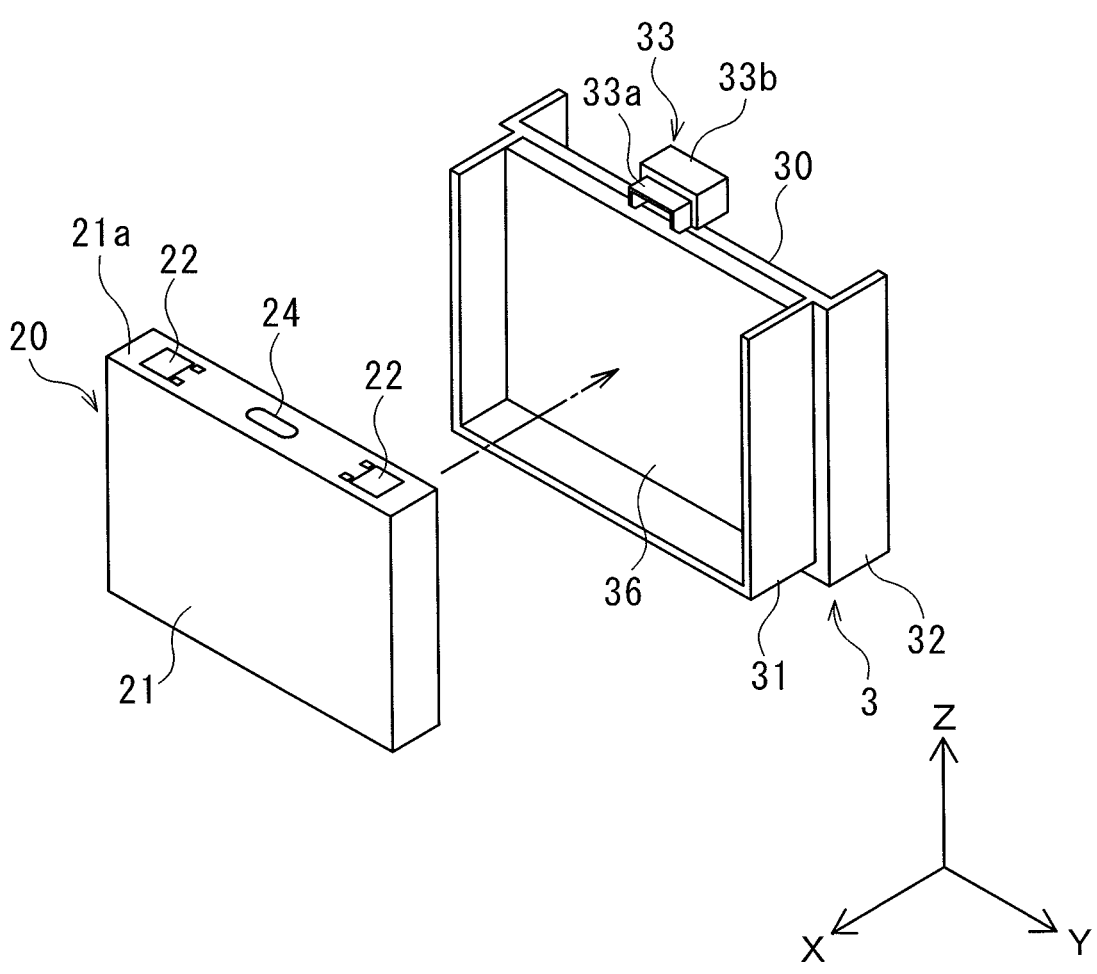
FIG. 3 is a perspective view illustrating an appearance of a separator and a battery.

FIG. 3 is a perspective view illustrating an appearance of separator 3 and battery 20. Separator 3 includes substrate 30 having a rectangular plate shape, holder part 31, guide part 32, fitting part 33, and displacement absorbing material 36. Holder part 31 is constituted by a wall body rising from three side parts of the bottom of substrate 30 and both ends in the horizontal direction toward one side of substrate 30, and the upper side is opened.

Guide part 32 corresponds to holder part 31, and is constituted by a wall body rising from three side parts of the bottom and both ends in the horizontal direction of substrate 30 toward the other side of substrate 30, and the upper side is opened. Holder part 31 has an outer dimension smaller than that of guide part 32, and is fitted into guide part 32 of adjacent separator 3.

Figure 4:
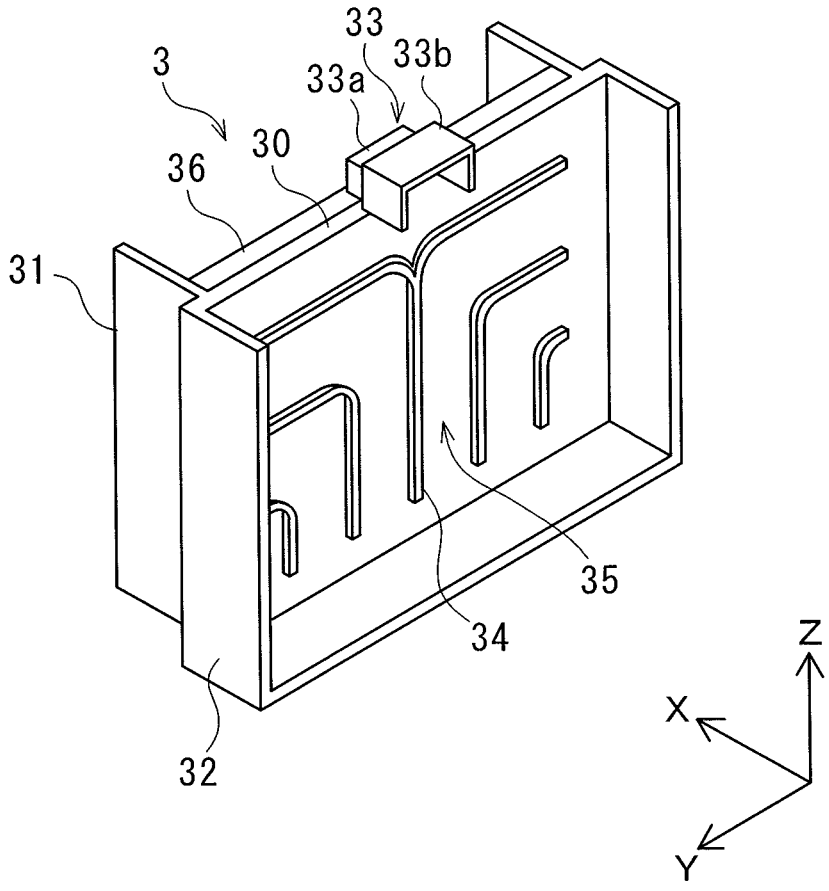
FIG. 4 is a perspective view of a separator as viewed from a guide part side.

FIG. 4 is a perspective view of separator 3 as viewed from guide part 32 side. Fitting part 33 is provided at the center of the side part on the upper side of substrate 30, and includes first fitting part 33a and second fitting part 33b. First fitting part 33a is constituted by wall bodies provided at both ends in the upper direction and the Y direction, and is provided so as to rise from the center of the side part on the upper side of substrate 30 to the same side as holder part 31. Similarly to first fitting part 33a, second fitting part 33b is constituted by wall bodies provided at both ends in the upper direction and the Y direction, and is provided so as to rise from the center of the side part on the upper side of substrate 30 to the same side as guide part 32. First fitting part 33a has a smaller outer dimension than second fitting part 33b, and is fitted inside second fitting part 33b provided in adjacent separator 3.

On guide part 32 side of substrate 30 of separator 3, air passage forming part 34 is formed. Air passage forming part 34 includes a plurality of strips protruding from the surface of substrate 30 on guide part 32 side, and air passage 35 is formed between the strips.

Plate-shaped displacement absorbing material 36 is provided inside holder part 31 of separator 3. Battery 20 comes into contact with displacement absorbing material 36 and is fitted inside holder part 31. Displacement absorbing material 36 is formed of a resin material or the like having lower rigidity than other parts of separator 3, and is compressed and deformed in the X direction to absorb displacement due to expansion of battery 20.

Each battery 20 is a rechargeable secondary battery such as a lithium-ion battery, a nickel-metal-hydride battery, or a nickel-cadmium battery. Additionally, each battery 20 is a so-called prismatic battery, and has outer covering can 21 having a flat rectangular-parallelepiped shape (see FIG. 3). One surface of outer covering can 21 is provided with an opening having a substantially rectangular shape not illustrated, and an electrode body, an electrolyte, and the like are accommodated in outer covering can 21 through the opening. Sealing plate 21a that closes the opening of outer covering can 21 is disposed in the opening.

Output terminal 22 of a positive electrode is disposed on sealing plate 21a at a position close to one end of sealing plate 21a in a longitudinal direction, and output terminal 22 of a negative electrode is disposed on sealing plate 21a at a position close to the other end of sealing plate 21a in the longitudinal direction. The pair of output terminals 22 is electrically connected to the corresponding one of a positive electrode plate and a negative electrode plate, constituting the electrode assembly. Respective output terminals 22 are inserted into through-holes (not illustrated) formed in sealing plate 21a. A seal member (not illustrated) having an insulating property is interposed between respective output terminals 22 and respective through-holes. In the following description, for convenience, sealing plate 21a is an upper surface of battery 20, and a bottom surface of outer covering can 21 facing sealing plate 21a is a lower surface of battery 20.

Battery 20 has two main surfaces that connect the upper surface and the lower surface of battery 20 to each other. The main surfaces are surfaces having the largest area out of the six surfaces of battery 20. The main surfaces are long side surfaces connected to the long sides of the upper surface and the long sides of the lower surface. Two remaining surfaces except for the upper surface, the lower surface, and the two main surfaces are referred to as the side surfaces of battery 20. These side surfaces are a pair of short side surfaces connected to the short sides of the upper surface and the short sides of the lower surface. These directions and positions are defined for the sake of convenience. Therefore, for example, the part defined as the upper surface in the present invention does not necessarily mean a part located above the part defined as the lower surface.

Valve 24 is disposed on sealing plate 21a between the pair of output terminals 22. Valve 24 is also referred to as a safety valve. Valve 24 is a mechanism for releasing a gas in each battery 20. Valve 24 is configured to release an internal gas by opening valve 24 when an internal pressure of outer covering can 21 is increased to a predetermined value or more. For example, valve 24 includes: a thin part that is formed on a part of sealing plate 21a and is thinner than other parts of valve 24; and a linear groove formed on a surface of the thin part. In this configuration, when an internal pressure of outer covering can 21 increases, valve 24 is opened by tearing the thin wall part with the groove as a tearing starting point.

The plurality of batteries 20 are stacked at predetermined intervals with the main surfaces of adjacent batteries 20 facing each other. Note that the term "stack" means that a plurality of members are arranged in any one direction. Thus, stacking batteries 20 also includes arranging the plurality of batteries 20 horizontally. In the present exemplary embodiment, batteries 20 are stacked horizontally. Each battery 20 is disposed such that output terminals 22 are directed in the same direction. In the present exemplary embodiment, each battery 20 is disposed such that output terminals 22 are directed upward in the vertical direction.

End separators 41 and 42 are provided between end plate 11 and battery 20 located at an end of battery stack 2 in the stacking direction of batteries 20 (see FIG. 2). End separator 41 is provided on one end in the stacking direction of batteries 20, and includes substrate 41a, guide part 41b, and air passage forming part 41c corresponding to substrate 30, guide part 32, and air passage forming part 34 of separator 3.

End separator 42 is provided on the other end in the stacking direction of batteries 20, and includes substrate 42*a* and holder part 42*b* corresponding to substrate 30 and holder part 31 of separator 3. In end separator 42, displacement absorbing material 36 is provided inside holder part 42*b*. In end separators 41 and 42, a member corresponding to fitting part 33 provided in separator 3 may be appropriately provided, and the member may be fitted to fitting part 33 of adjacent separator 3.

Two end plates 11 provided at both ends in the stacking direction of batteries 20 in battery stack 2 are attached to side plate 12 and base plate 13. Battery stack 2, separator 3, and end separators 41 and 42 are disposed between two end plates 11 such that adjacent parts in the stacking direction are brought into contact with each other, and are held by a uniaxial constraint (constraint in the X direction). In addition, battery stack 2, separator 3, and end separators 41 and 42 may be disposed between two end plates 11 in a state where displacement absorbing material 36 is slightly compressed and deformed, and the internal preload of the uniaxial constraint may be increased.

Figure 5:
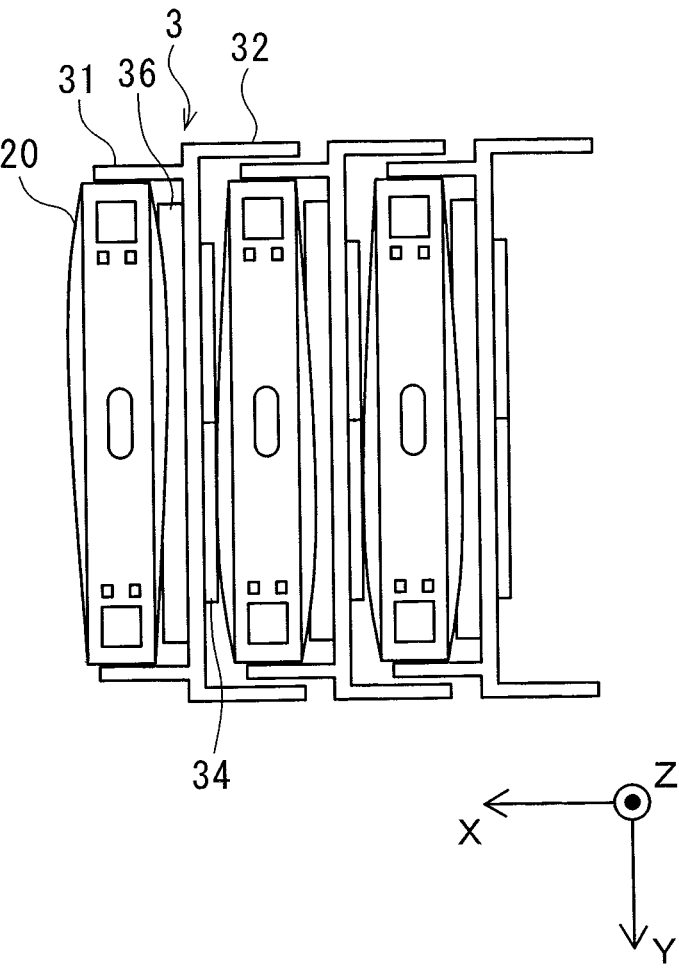
FIG. 5 is a schematic diagram for explaining displacement of each battery in a case where a displacement absorbing material is provided.
Figure 6:
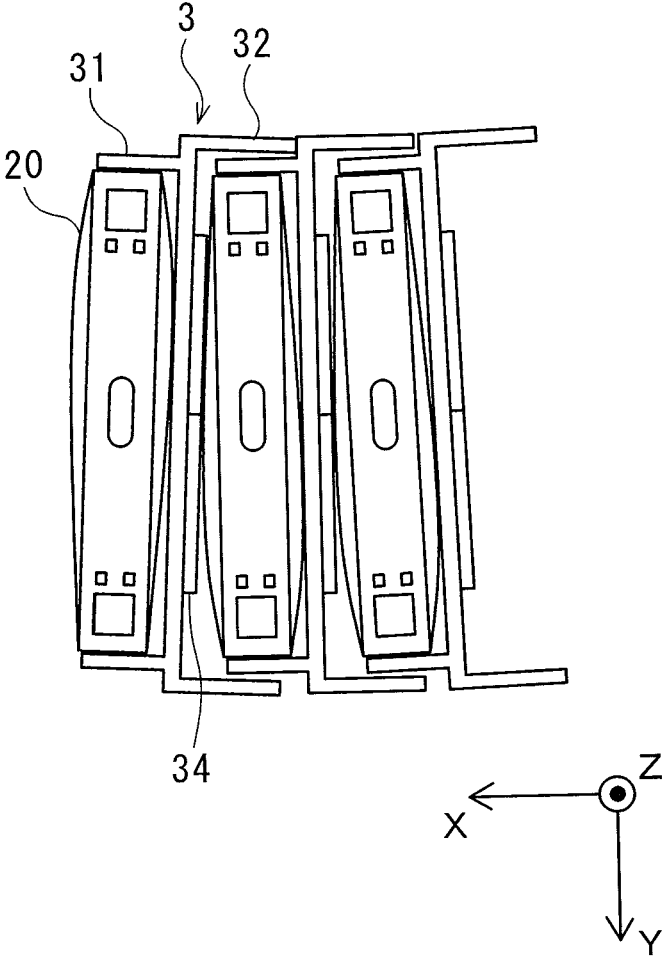
FIG. 6 is a schematic diagram for explaining a state in which a battery in a battery module bulges in a stacking direction.

Next, the operation of battery module 100 will be described with respect to occurrence of displacement due to expansion of battery 20. FIG. 5 is a schematic diagram for explaining the displacement of each battery in a case where displacement absorbing material 36 is provided. FIG. 6 is a schematic diagram for explaining the displacement of each battery in a case where displacement absorbing material 36 as a comparative example is not provided. FIGS. 5 and 6 correspond to a plan view of battery stack 2 as viewed from above. As described above, in each battery 20, an internal electrode body, an electrolyte, and the like degrade over time, and bulge due to deposition or oxidation of a metal material, and a change appears in an outer shape. Each battery 20 is a prismatic battery and includes the outer covering can 21 having a flat rectangular-parallelepiped shape, and among the six surfaces of battery 20, the main surface having the largest area is deformed so as to expand.

Two end plates 11 are attached to side plate 12 and base plate 13, whereby battery stack 2, separator 3, and end separators 41 and 42 are held by uniaxial constraint (constraint in the X direction). Battery stack 2, separator 3, and end separators 41 and 42 are assembled between two end plates 11 in a state where displacement absorbing material 36 is slightly compressed and deformed, whereby the internal preload of the uniaxial constraint is increased.

As illustrated in FIG. 5, when deformation occurs in the stacking direction due to expansion of the main plane of battery 20, displacement absorbing material 36 provided on separator 3 and the like is elastically compressed and deformed, and a load acting in the stacking direction is dispersed in the contact surface between the main plane and displacement absorbing material 36. When the load acting on battery 20 is dispersed on the contact surface, battery 20 returns to its original orientation. Thus, in battery module 100, each battery 20 in battery module 100 is held in a uniaxial constraint, and even if battery 20 bulges due to aged degradation, battery 20 returns to its original orientation, so that variation in relative displacement of each battery 20 can be suppressed.

In the comparative example illustrated in FIG. 6, when deformation occurs in the stacking direction due to the expansion of the main plane of battery 20, battery 20 is displaced according to the position of the contact point, the orientation of each battery changes, and variation in the relative displacement of each battery 20 occurs.

Separator 3 is provided with holder part 31 into which battery 20 is fitted on one side in the stacking direction, and guide part 32 into which holder part 31 of the separator adjacent to the other side is fitted. In battery module 100, holder part 31 and guide part 32 are fitted between adjacent separators 3, so that displacement of battery 20 in a direction intersecting the stacking direction can be suppressed.

Since displacement absorbing material 36 is provided inside holder part 31, when battery 20 is deformed, holder part 31 and battery 20 are fitted to each other, and the contact surface between battery 20 and displacement absorbing material 36 can ensure the retainability of battery 20 in separator 3.

Separator 3 is provided with air passage forming part 34 on guide part 32 side. Battery module 100 can secure air passage 35 for air cooling of battery 20 while battery 20 is in contact with air passage forming part 34.

MODIFIED EXAMPLE

Figure 7:
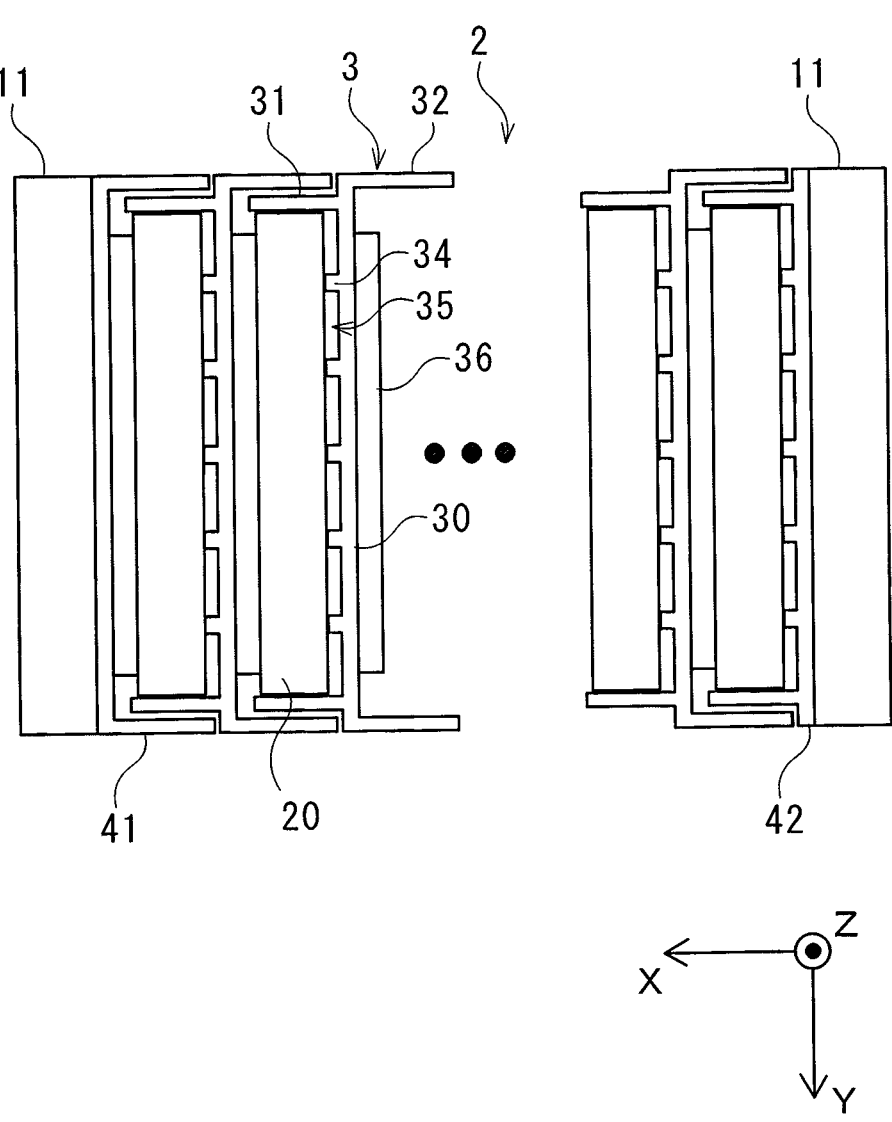
FIG. 7 is a schematic diagram for explaining a battery stack according to a modified example.

FIG. 7 is a schematic diagram for describing battery stack 2 according to a modified example. FIG. 7 corresponds to a plan view of battery stack 2 as viewed from above. In battery stack 2 according to the modified example, displacement absorbing material 36 is provided on separator 3 on a side of guide part 32 of substrate 30. Battery 20 is in contact with displacement absorbing material 36 provided on guide part 32 side of the adjacent separator 3 while being held by holder part 31 of one separator 3. As a result, when battery 20 bulges, battery 20 and displacement absorbing material 36 are brought into surface contact with each other, whereby a contact area of battery 20 with respect to the adjacent separator 3 can be secured.

In battery stack 2 according to the modified example, air passage forming part 34 is provided on holder part 31 side of substrate 30 in separator 3, and air passage 35 for air cooling of battery 20 can be secured in a state where battery 20 is in contact with air passage forming part 34.

The present invention has been described based on the exemplary embodiment of the present invention. As a person skilled in the art understands, the exemplary embodiment is exemplified, and the exemplary embodiment is variously varied and modified within a scope of claims of the present invention. Further, such variations and modified examples fall within the scope of the claims of the present invention. Therefore, it should be understood that the description and the drawings herein are not limitative, but are illustrative.

The exemplary embodiment may be defined by the following items.

[Item 1]

Battery module (100) including: battery stack (2) in which a plurality of batteries (20) are stacked; and separator (3) disposed between adjacent batteries (20), the separator including displacement absorbing material (36) in contact with a surface intersecting a stacking direction of any one of the plurality of batteries (20), in which positions of both ends of battery stack (2) in the stacking direction are fixed, and battery stack (2) is disposed.

Thus, battery module (100) can suppress variation in relative displacement of batteries (20) while holding batteries (20) in battery module (100) with a uniaxial constraint.

[Item 2]

Battery module (100) according to Item 1, in which separator (3) includes holder part (31) into which battery (20) is fitted on one side in the stacking direction, and guide part (32) into which holder part (31) of separator (3) adjacent to another side is fitted. Thus, in battery module (100), holder part (31) and guide part (32) are fitted between adjacent separators (3), so that displacement of battery (20) in a direction intersecting the stacking direction can be suppressed.

[Item 3]

Battery module (100) according to Item 2, in which the displacement absorbing material is provided on the one side. Consequently, in battery module (100), holder part (31) and battery (20) are fitted to each other, and a contact surface between battery (20) and displacement absorbing material (36) can ensure a holding property of battery (20) in separator (3).

[Item 4]

Battery module (100) according to Item 3, in which air passage (35) between separator (3) and battery (20) disposed on the other side is disposed on the other side of the separator (3). Thus, battery module (100) can secure air passage (35) for air cooling of battery (20).

[Item 5]

Battery module (100) according to Item 2, in which the displacement absorbing material is provided on the other side. Thus, battery module (100) can ensure a contact area of battery (20) with adjacent separator (3).

REFERENCE MARKS IN THE DRAWINGS

2 battery stack
20 battery
3 separator
31 holder part
32 guide part
35 air passage
36 displacement absorbing material
100 battery module

The invention claimed is:

1. A battery module comprising:

a battery stack including a plurality of batteries stacked; and separators each disposed between the batteries adjacent to each other, the separators each including a displacement absorbing material in contact with a surface of any one of the plurality of batteries, the surface intersecting a stacking direction, wherein positions of both ends of the battery stack in the stacking direction are fixed, and the battery stack is disposed, wherein each separator includes a substrate intersecting with the stacking direction;

a holder part of each separator constituted by a wall body rising from side part of the substrate toward one side in the stacking direction, and into the holder part each of the batteries is fitted on the one side in the stacking direction; and a guide part constituted by a wall body rising from side part of the substrate toward another side in the stacking direction, and into the guide part a holder part of an adjacent separator among the separators on another side is fitted, wherein the entire holder part has an outer dimension smaller than an inner dimension of an entire guide part of the adjacent separator, and wherein the battery stack and the separators are held by a uniaxial constraint in the stacking direction.

2. The battery module according to claim 1, wherein the displacement absorbing material is provided on the one side.

3. The battery module according to claim 2, wherein an air passage is disposed between the another side of each of the separators and each of the batteries disposed on the another side of the each of the separators.

4. The battery module according to claim 1, wherein the displacement absorbing material is provided on the another side.

* * * * *